United States Patent
Schulz

[11] Patent Number: 5,921,202
[45] Date of Patent: Jul. 13, 1999

[54] ROUND BALE FEEDER

[76] Inventor: John C. Schulz, 408 Iowa St., Burlington, Iowa 52601

[21] Appl. No.: 08/870,567

[22] Filed: Jun. 6, 1997

Related U.S. Application Data

[51] Int. Cl.⁶ .................................................. A01K 5/00
[52] U.S. Cl. .................................. 119/60; 119/58
[58] Field of Search ........................... 119/58, 60, 61; 248/200, 218.4, 251

[56] References Cited

U.S. PATENT DOCUMENTS

| | | | |
|---|---|---|---|
| D. 157,593 | 3/1950 | Hollaender | D8/382 |
| D. 264,138 | 4/1982 | Harden | D30/131 |
| 900,663 | 11/1908 | Callane | 403/388 |
| 1,018,095 | 2/1912 | Brown | 119/60 |
| 1,236,231 | 8/1917 | Thomas | 411/367 |
| 1,963,981 | 6/1934 | Garrett | 249/27 |
| 2,323,829 | 7/1943 | McArthur | 403/388 |
| 2,729,196 | 1/1956 | Breitenbach | 119/60 |
| 2,745,155 | 5/1956 | Collins | 248/300 |
| 2,858,153 | 11/1958 | Petersen | 403/388 |
| 2,891,296 | 6/1959 | Darde | 403/391 |
| 3,069,189 | 12/1962 | Hollaender | 403/385 |
| 3,107,932 | 10/1963 | Johnson et al. | 403/176 |
| 3,626,468 | 12/1971 | Hanson | 119/58 |
| 3,777,713 | 12/1973 | Deats | 119/60 |
| 3,906,903 | 9/1975 | Vandewater | 119/60 |
| 4,706,609 | 11/1987 | Delichte | 119/58 |
| 5,109,796 | 5/1992 | Monus | 119/221 |
| 5,220,744 | 6/1993 | Kendall | 248/218.4 |
| 5,337,699 | 8/1994 | Dyson | 119/60 |
| 5,492,295 | 2/1996 | Remmers | 248/251 |
| 5,522,345 | 6/1996 | Payne | 119/58 |
| 5,582,131 | 12/1996 | Curtis | 119/60 |

Primary Examiner—Michael J. Carone
Assistant Examiner—Elizabeth Shaw
Attorney, Agent, or Firm—Henderson & Sturm

[57] ABSTRACT

A round bale feeding device including upwardly extending slant bars that support the horizontally disposed rings. The bars extend at an angle from the bottom ring to the top ring, performing not only the support function for the rings but also providing the slant bar feature in the feeding zone. The slant bars are angularly affixed to the rings by means of molded plastic alignment brackets which provide connection and support to the feeder. The brackets simultaneously function as a secure clamp and an angle alignment device for properly positioning the rings and slant bars as the device is assembled.

17 Claims, 3 Drawing Sheets

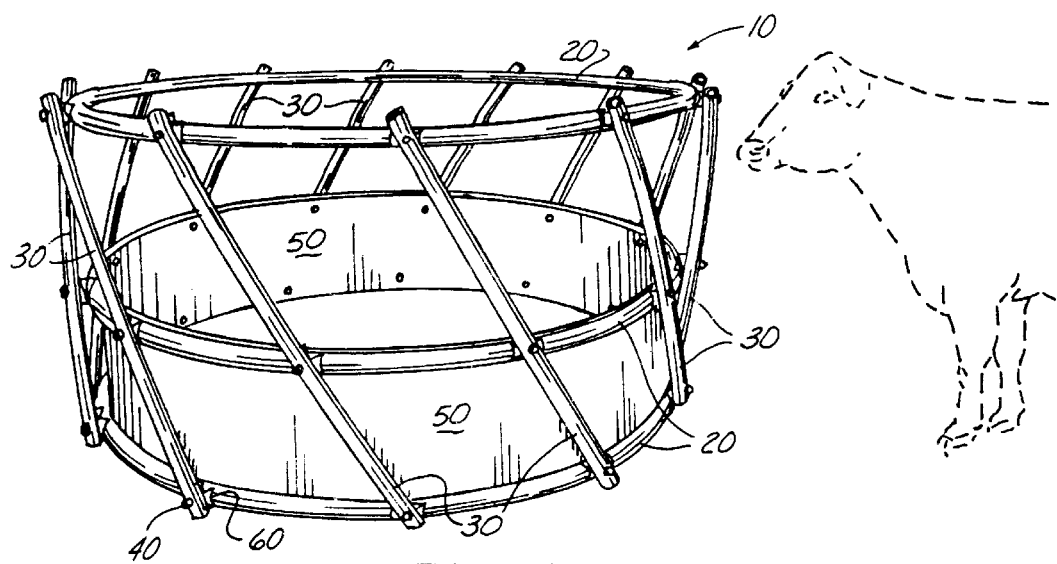
Fig. 1
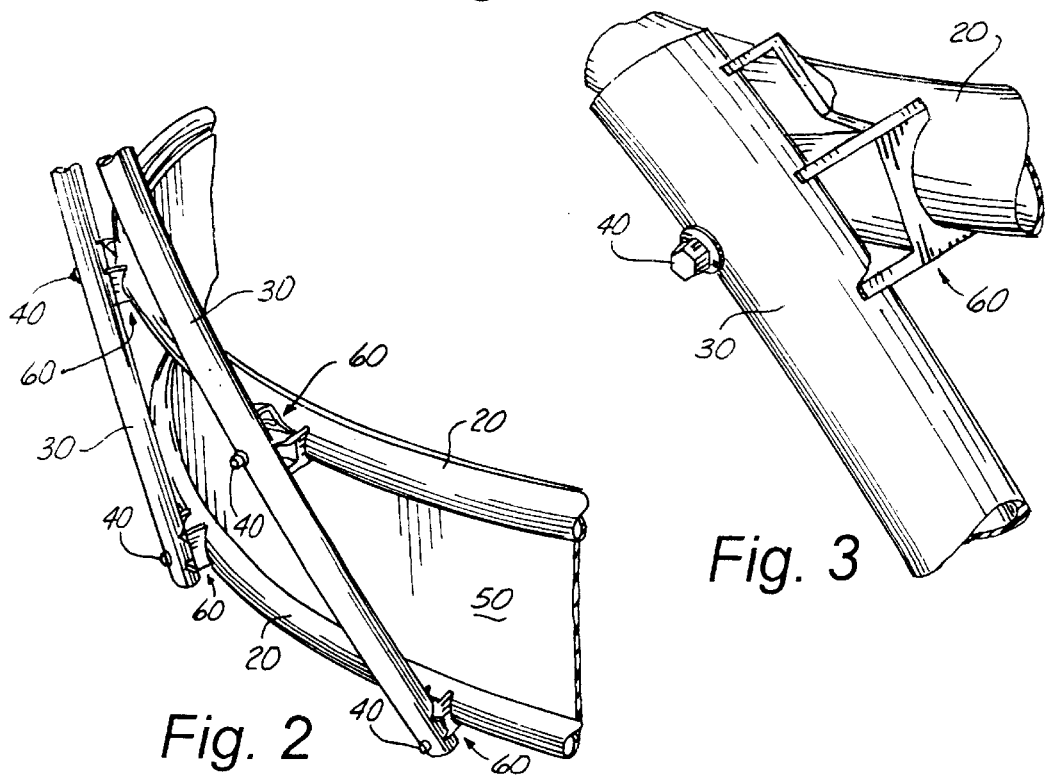
Fig. 2
Fig. 3

ROUND BALE FEEDER

CROSS-REFERENCE TO RELATED APPLICATIONS

Not Applicable

STATEMENT REGARDING FEDERALLY SPONSORED RESEARCH OR DEVELOPMENT

Not Applicable

AUTHORIZATION PURSUANT TO 37 C.F.R. §1.71 (d) (e)

A portion of the disclosure of this patent document, including appendices, may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates generally to livestock feeding devices, and more particularly to a device for dispensing round hay bales to animals, and a method of constructing a round bale feeder.

2. Description of the Related Art

Numerous devices have been used to contain and dispense round hay bales to animals, most often cattle. Since livestock will not eat hay that has been trampled or spoiled, it is important to have a means to effectively contain the hay bale to reduce waste and still allow adequate access to the livestock. In its most simple configuration, a round bale feeder utilizes a plurality of circular rings supported by vertical legs. It is known in the art that these are constructed out of steel or plastic material. An improvement to this design utilizes the addition of a sheet metal band or skirt welded to the lower area of a metal bale feeder to contain the hay that has been pulled or falls from the bale. In an additional effort to contain the hay and to limit the amount of hay that can be pulled from the feeder, slant bars are often added to the feeding spaces in the feeders. The principal drawback to the metal design is its vulnerability to corrosion and the lack of the ability to easily replace damaged parts. Also, both metal and plastic units, when shipped to the dealer and end user assembled, are very bulky and inconvenient to handle. When shipped unassembled, these feeders are difficult to assemble. The need exists for a long life, serviceable, bale feeder that efficiently contains the hay to reduce waste.

Those concerned with these and other problems recognize the need for an improved round bale feeder.

BRIEF SUMMARY OF THE INVENTION

The present invention discloses a round bale feeding device including upwardly extending slant bars that support the horizontally disposed rings. The bars extend at an angle from the bottom ring to the top ring, performing not only the support function for the rings but also providing the slant bar feature in the feeding zone. The slant bars are angularly affixed to the rings by means of molded plastic alignment brackets which provide connection and support to the feeder. The brackets simultaneously function as a secure clamp and an angle alignment device for properly positioning the rings and slant bars as the device is assembled.

Therefore, an object of the present invention is the provision of an improved round bale feeder.

Another object of the invention is to provide a round bale feeder that can be quickly and easily assembled using simple tools.

BRIEF DESCRIPTION OF THE SEVERAL VIEWS OF THE DRAWINGS

Other objects, advantages, and novel features of the present invention will become apparent from the following detailed description of the invention when considered in conjunction with the accompanying drawings, wherein:

FIG. 1 is a perspective view of the round bale feeder of the present invention assembled and ready for use;

FIG. 2 is an enlarged partial perspective view of the lower section of the feeder;

FIG. 3 is a further enlarged partial perspective view showing the connection of the slant bar, the alignment bracket, and the ring by a bolt and nut fastener;

DETAILED DESCRIPTION OF THE INVENTION

Figure 4:
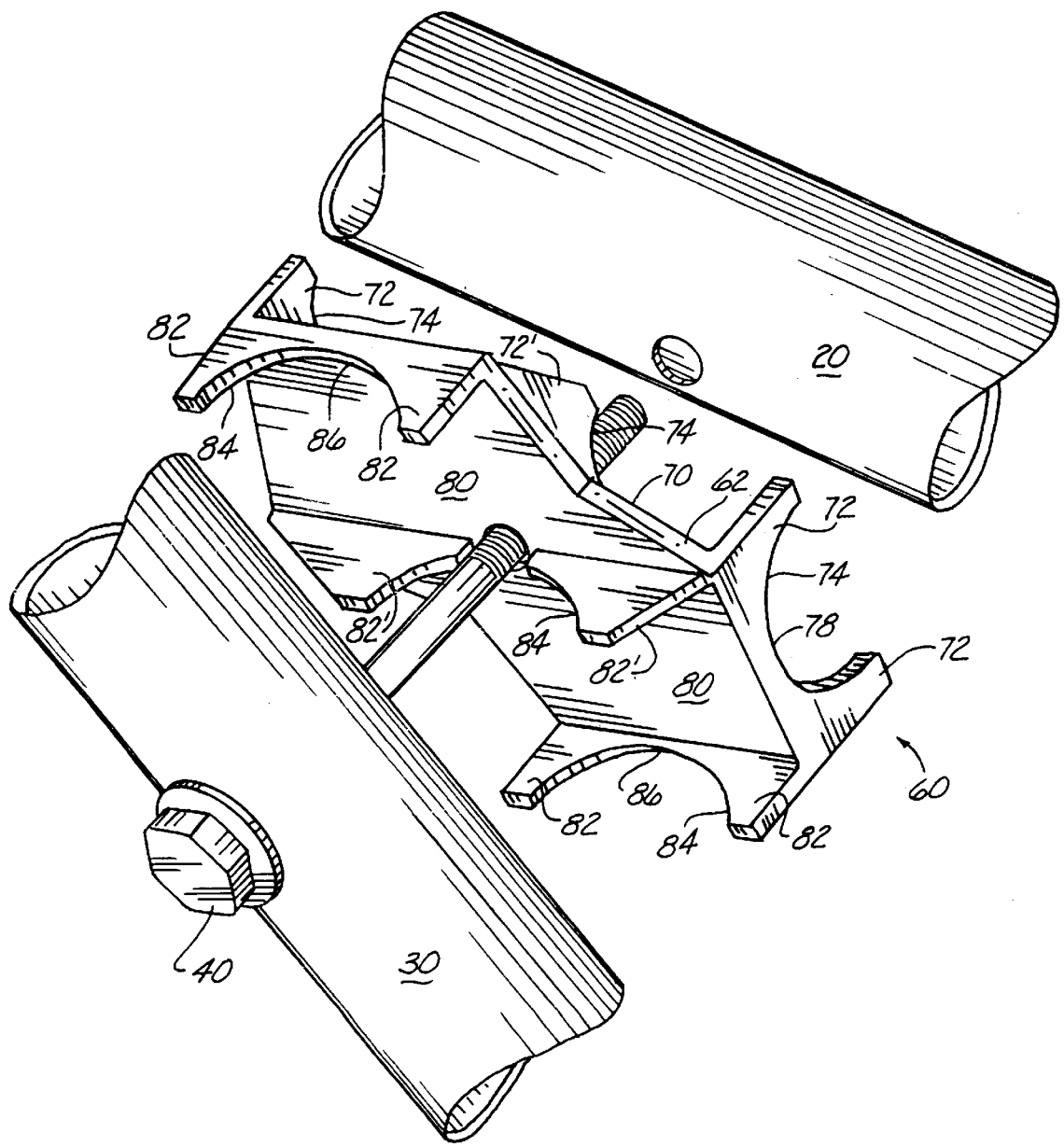
FIG. 4 is a greatly enlarged exploded partial perspective view showing the connection of the bar, bracket, and ring.

Referring now to the drawings, wherein like reference numerals designate identical or corresponding parts throughout the several views, FIG. 1 shows the round bale feeder (10) of the present invention assembled and ready for use. The feeder (10) includes a number of horizontal rings (20) and a number of slant bars (30) connected by bolt and nut fasteners (40). A feed saver band (50) is shown attached to the inner surface of the two adjacent bottom rings (20) to contain hay that is pulled from or falls from the bale (not shown). An alignment bracket (60) is provided between the rings (20) and the bars (30) at each intersection point.

Figure 5:
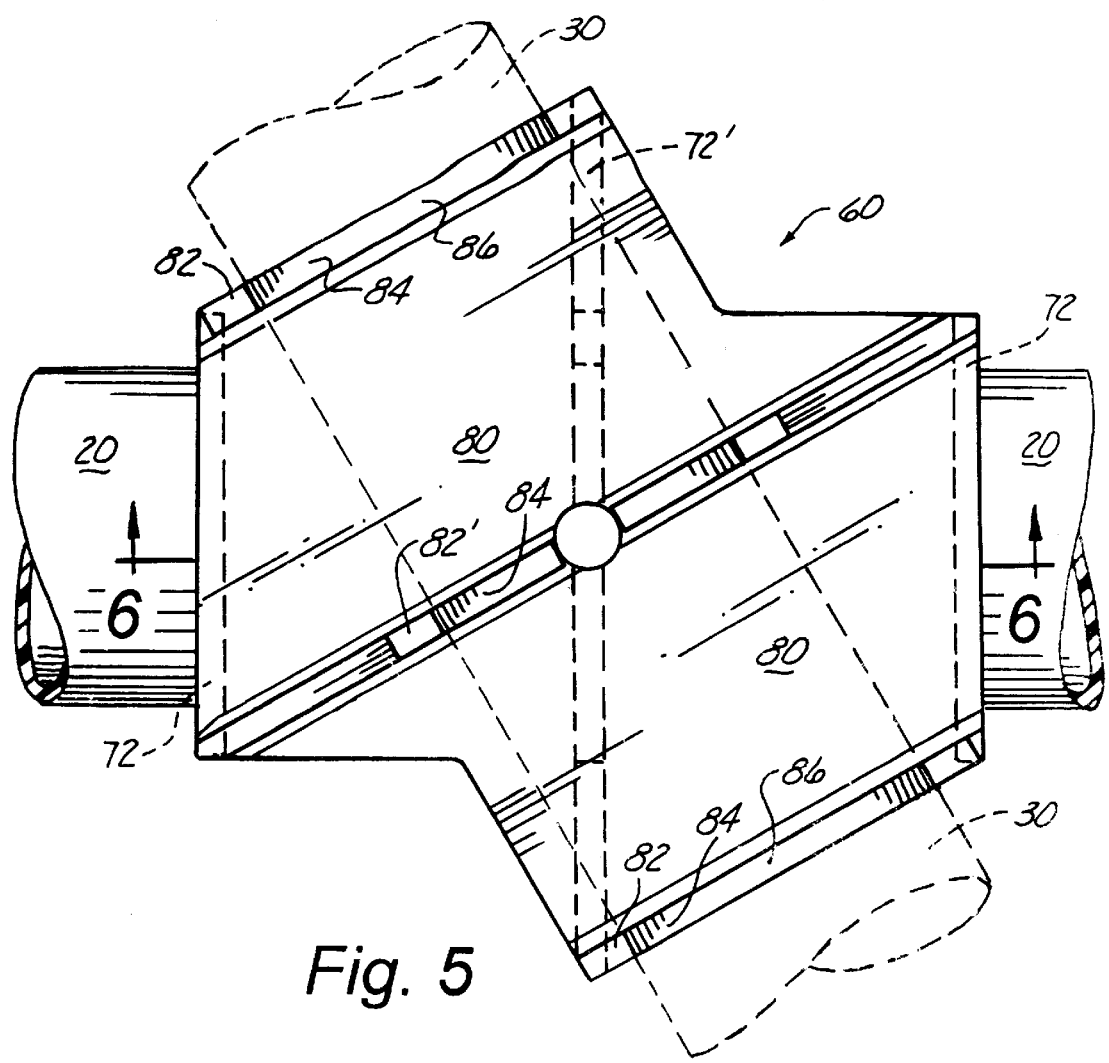
FIG. 5 is a front elevational view showing the connection with the slant bar shown in dashed line to show the bar face of the bracket base plate.
Figure 6:
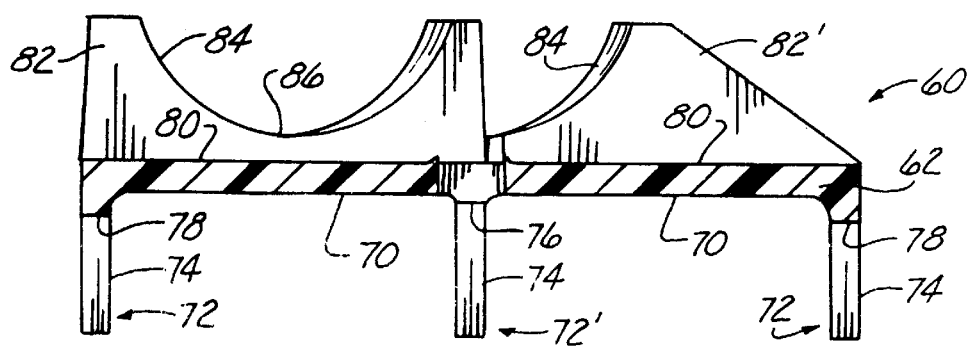
FIG. 6 is a sectional view of the alignment bracket taken along line 6—6 of FIG. 5.

As best shown in FIGS. 2–6, each bracket (60) has a base plate (62) that includes a ring face (70) and bar face (80). The ring face (70) has end ribs (72) and a center rib (72') that extend from the base plate (62). Each rib (72, 72') has an arcuate recessed cradle (74). As shown in FIG. 6, the base (76) of the cradle (74) of the center rib (72') is not elevated above the ring face (70) as far as the base (78) of the cradle (74) of the end ribs (72). This provides for the arc of the rings (20) and allows all portions of the rings (20) to matingly engage all three cradles (74).

The bar face (80) also has end ribs (82) and a center rib (82') that extend from the base plate (62). Each rib (82, 82') has an arcuate recessed cradle (84) with a base (86). The base (86) of the cradle (84) of the center rib (82') and the end ribs (82) is located at the same elevation from the bar face (80). This allows all portions of the slant bars (30) to matingly engage all three cradles (84).

As most clearly shown in FIG. 5, the ribs (72, 72') of the ring face (70) are disposed at an oblique angle to the ribs (82, 82') of the bar face (80). This angular arrangement corresponds to the desired angular arrangement of the rings (20) and the slant bars (30). Also, it is important to note that the center ring face rib (72') (dashed line in FIG. 5) extends across the ring face (70) diagonally between the two end bar face ribs (82). This acts as a reinforcing web to hold one side of the end bar face ribs (82) from major radial deflection away from the slant bar (30) as the fasteners (40) are tightened. Similarly, the center bar face rib (82') extends across the bar face (80) diagonally between the two end ring face ribs (72) (dashed line in FIG. 5). This too acts as a reinforcing web.

Referring to FIG. 4, it can be seen that the right side of the center bar face rib (82') is disposed directly behind the left side of the end ring face rib (72). Also, the right side of the end bar face rib (82) is disposed directly behind the right side of the end ring face rib (72). Both the left and right sides of the end ring face rib (72) are thus stabilized against deflection as the fasteners (40) is tightened since the force of the ring (20) against the end ring face rib (72) is balanced by the force of the bar (30) against the center bar face rib (82'). If the center bar face rib (82') were not present, the left side of the end ring face rib (72) would deflect radially away from the ring (20) as the fastener (40) is tightened since there would be no supporting structure behind it.

It is to be understood that the rings (20) and bars (30) could have cross-sectional shapes other than the circular shapes illustrated, so long as the cradles (74 and 84) correspond in shape to allow mating engagement. Also, although various materials of construction may be used, it is preferable to use light-weight corrosion resistant materials such as plastic rings (20), bars (30), skirts (50), and brackets (60), and stainless steel fasteners (40). Further, although a single fastener (40) is shown making the connection at each intersection point, it is to be understood that multiple fasteners (40) or different types of fasteners could be used.

The method of constructing the round bale feeder (10) of the present invention is now described for a three-ring feeder with a feed saver band. It is to be understood that the construction can be undertaken by a manufacturer or distributor, but it is preferable that the construction be done by the end user so that distribution and shipping economies can be realized.

The assembly of a three-ring feeder (10) requires the following materials:
  3—8 foot diameter rings;
  36—3/8" diameter×6" stainless steel hex-head bolts;
  1—feed saver band;
  48—stainless steel flat washers for 3/8" diameter bolts;
  12—slant bar legs;
  36—3/8" hex stainless steel lock nuts;
  36—poly spacer brackets; and
  24—3/8" stainless steel fender washers.

First the assembler must note that the poly spacer brackets are not symmetrical. On the ring side the center rib is flush with the base plate of the bracket at the center hole while on the bar side, the center rib is raised by 3/16 inch above the base plate. The side of the bracket with the raised rib always goes toward the outside of the feeder so it is next to the slant bar leg.

The assembly is started by obtaining one of the twelve legs and identifying the end with a hole spacing of 21.4 inches between holes. This end will be the bottom of the bale feeder and these two holes will be used to secure the feed saver band as well as mount the lower two rings. A flat washer is placed next to the head of a bolt and the bolt is inserted through the lower hole in the leg. A spacer bracket is placed over the bottom so the bracket ribs engage the leg. The raised center rib should be toward the leg and the flush center rib should be opposite the leg. The bolt from this leg and bracket assembly is then inserted through one of the holes in a ring. The spacer bracket ribs should now engage the ring. The feed saver band is then placed inside the ring. The bolt from this leg, bracket, and ring assembly is then aligned with the second bottom hole from one end of the feed saver band and the bolt is inserted in that hole. Fender washers and lock nuts are then installed. The fender washers are larger than standard flat washers and are used to cover the slots between the feed saver band and the lock nuts. The nuts are tightened only enough to secure the leg in position. During remaining assembly, none of the nuts are completely tightened until the feeder is completely assembled.

The second, or middle ring, can be held in place by inserting bolts with flat washers in four holes equally spaced in the liner and ring. The liner will overlap at one set of holes. The eleven remaining feeder posts are then installed with bolts, flat washers, fender washers, and spacer brackets, to the two rings and feed saver band. The fasteners are not tightened. Next, the top ring is installed. If assembly is being done by one person only, the next steps will be aided if a temporary support 25" in length is utilized to position the top ring above the middle ring.

Because the legs are at an angle, the top of the leg will need to be pulled inward to meet the ring. The bolts, spacer brackets, nuts and washers are installed as above except a flat washer is used in place of the fender washer under the nut on the inside of the feeder. In all cases, the nuts should be positioned on the inside of the assembly. When tightening the nut as instructed below, it is important to not over-tighten the joint. The joint is usually properly tightened when approximately 3/8" to 1/2" of bolt thread protrudes beyond the nut. All joints should be re-checked for tightness after some period of usage.

To complete the assembly, the first bolt installed is tightened followed by the bolt in the second ring above and slightly clockwise from it. The liner must be against the feeder rings as the remaining bolts are tightened, alternating from the bottom to the second ring. It is important that the liner is a snug to the rings as possible. Finally, the bolts in the top ring are tightened and the assembly is now complete and the feeder is ready for usage.

Because the feeder is relatively light weight and very durable, the user may wish to first place the bale in the desired location and then place the feeder over the top of the bale. The feeder can easily be rolled from one location to another.

If it is desired to lower the top ring to narrow the feed opening, the user simply drills 7/16" diameter holes in the legs at the desired height. The existing bolts are then removed and the ring is repositioned to align the new holes with the bracket and leg holes. The mounting bolts are then re-installed.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:
1. A round bale feeder, comprising:
  a plurality of horizontally disposed rings;
  a plurality of slant bars, each bar being disposed to intersect each of the rings at intersection points;
  an alignment bracket disposed between the rings and the bars at each intersection point, each bracket having a base plate, the base plate including a ring face having aligned ribs extending from the base plate to receive portions of one of the rings, and a bar face having aligned ribs extending from the base plate opposite the ring face ribs to receive portions of one of the bars, the ribs of the ring face being disposed at an oblique angle to the ribs of the bar face, wherein each bracket includes three ring face ribs including opposite end ring face ribs and an intermediate ring face rib, each of the ring face ribs including a recessed cradle for receiving a portion of one of the rings, wherein the end cradles include a base which is elevated above the ring face further than the intermediate cradle; and fasteners disposed to engage and secure the bracket, the rings, and the bars together at each intersection point.

2. The round bale feeder of claim 1, further including a feed saver band attached to an inner surface of the rings with the fasteners, the band being disposed to extend between two adjacent bottom rings to enclose a bottom section of the feeder.

3. The round bale feeder of claim 1 wherein each bracket includes three bar face ribs including opposite end bar face ribs and an intermediate bar face rib, each of the bar face ribs including a recessed cradle for receiving a portion of one of the bars.

4. The round bale feeder of claim 1 wherein each bracket includes three bar face ribs including opposite end bar face ribs and an intermediate bar face rib, each of the bar face ribs including a recessed cradle for receiving a portion of one of the bars.

5. The round bale feeder of claim 4 wherein the intermediate ring face rib extends across the ring face of the base plate diagonally between the end bar face ribs disposed on the opposite bar face of the base plate.

6. The round bale feeder of claim 4 wherein the intermediate bar face rib extends across the bar face of the base plate diagonally between the end ring face ribs disposed on the opposite ring face of the base plate.

7. The round bale feeder of claim 4 wherein the end cradles include a base which is elevated above the ring face further than the intermediate cradle.

8. The round bale feeder of claim 7 wherein the intermediate ring face rib extends across the ring face of the base plate diagonally between the end bar face ribs disposed on the opposite bar face of the base plate.

9. The round bale feeder of claim 8 wherein a cross-section of the rings is circular, a cross-section of the bars is circular, and the cradles are arcuate to matingly receive portions of the rings and portions of the bars.

10. The round bale feeder of claim 9 wherein the fasteners are received through aligned openings in the rings, the bars, and the bracket.

11. The round bale feeder of claim 10 wherein the opening in the bracket extends perpendicular to the base plate and intersects both the cradle of the intermediate ring face rib and the cradle of the intermediate bar face rib.

12. The round bale feeder of claim 7 wherein the intermediate bar face rib extends across the bar face of the base plate diagonally between the end ring face ribs disposed on the opposite ring face of the base plate.

13. The round bale feeder of claim 12 wherein a cross-section of the rings is circular, a cross-section of the bars is circular, and the cradles are arcuate to matingly receive portions of the rings and portions of the bars.

14. The round bale feeder of claim 13 wherein the fasteners are received through aligned openings in the rings, the bars, and the bracket.

15. The round bale feeder of claim 14 wherein the opening in the bracket extends perpendicular to the base plate and intersects both the cradle of the intermediate ring face rib and the cradle of the intermediate bar face rib.

16. A round bale feeder, comprising:

a plurality of horizontally disposed rings;

a plurality of slant bars, each bar being disposed to intersect each of the rings at intersection points;

an alignment bracket disposed between the rings and the bars at each intersection point, each bracket having a base plate, the base plate including a ring face having aligned ribs extending from the base plate to receive portions of one of the rings, and a bar face having aligned ribs extending from the base plate opposite the ring face ribs to receive portions of one of the bars, the ribs of the ring face being disposed at an oblique angle to the ribs of the bar face wherein each bracket includes three ring face ribs including opposite end ring face ribs and an intermediate ring face rib, each of the ring face ribs including a recessed cradle for receiving a portion of one of the rings, wherein each bracket includes three bar face ribs including opposite end bar ribs and an intermediate bar face rib, each of the bar face ribs including a recessed cradle for receiving a portion of one of the bars, wherein the end cradles include a base which is elevated above the ring face further than the intermediate cradle; and fasteners disposed to engage and secure the bracket, the rings, and the bars together at each intersection point.

17. The round bale feeder of claim 16, wherein said fasteners disposed to extend through the bracket, the rings, and the bars to engage and secure them together at each intersection point.

* * * * *